Sept. 1, 1964  H. KLAUE  3,146,627
POWER DRIVE

Filed July 22, 1960  8 Sheets-Sheet 1

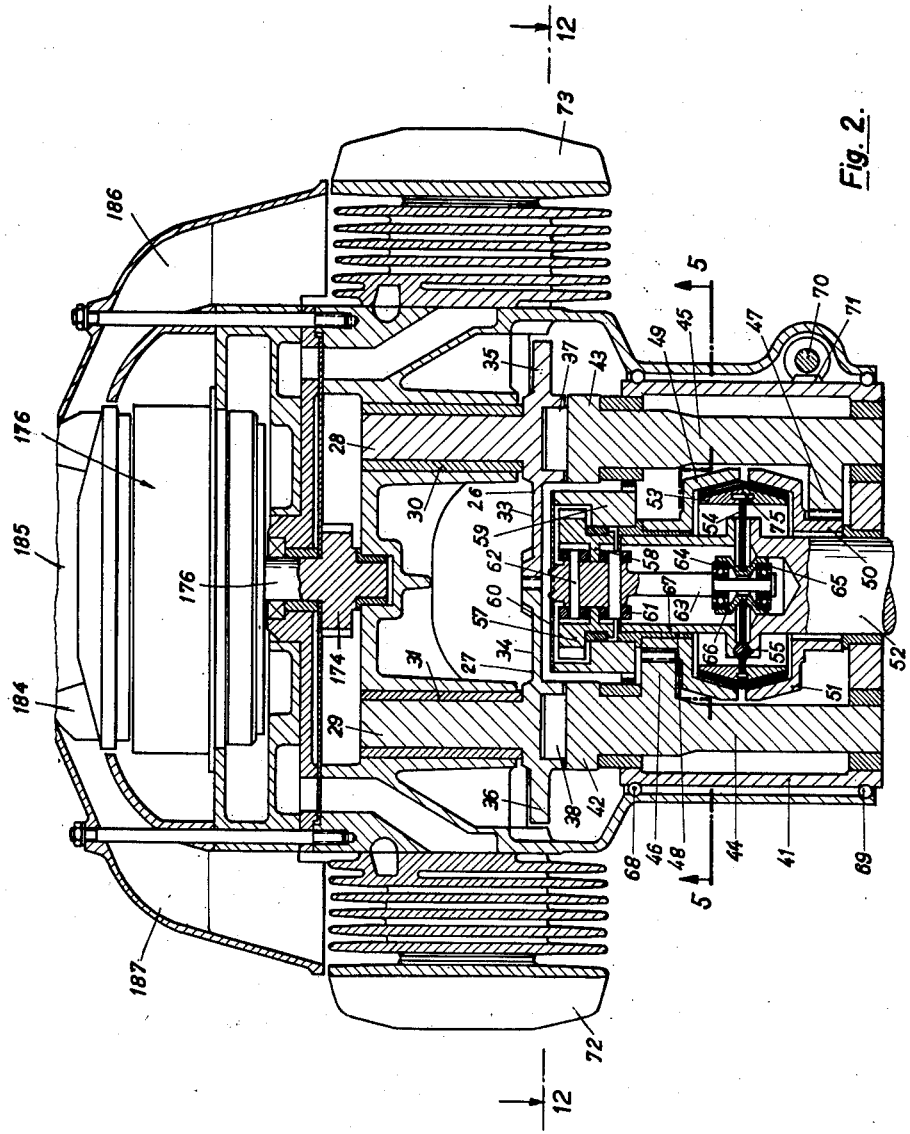

Sept. 1, 1964
H. KLAUE
POWER DRIVE
3,146,627
Filed July 22, 1960
8 Sheets-Sheet 3
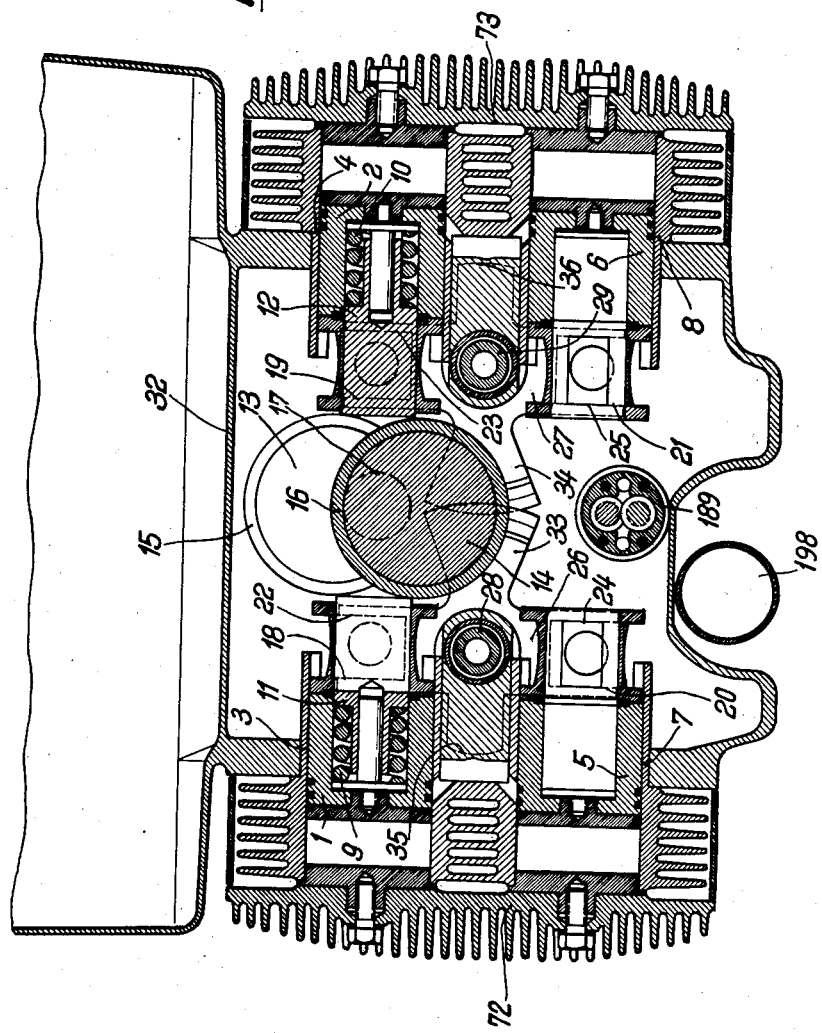

Sept. 1, 1964  H. KLAUE  3,146,627
POWER DRIVE
Filed July 22, 1960  8 Sheets-Sheet 4
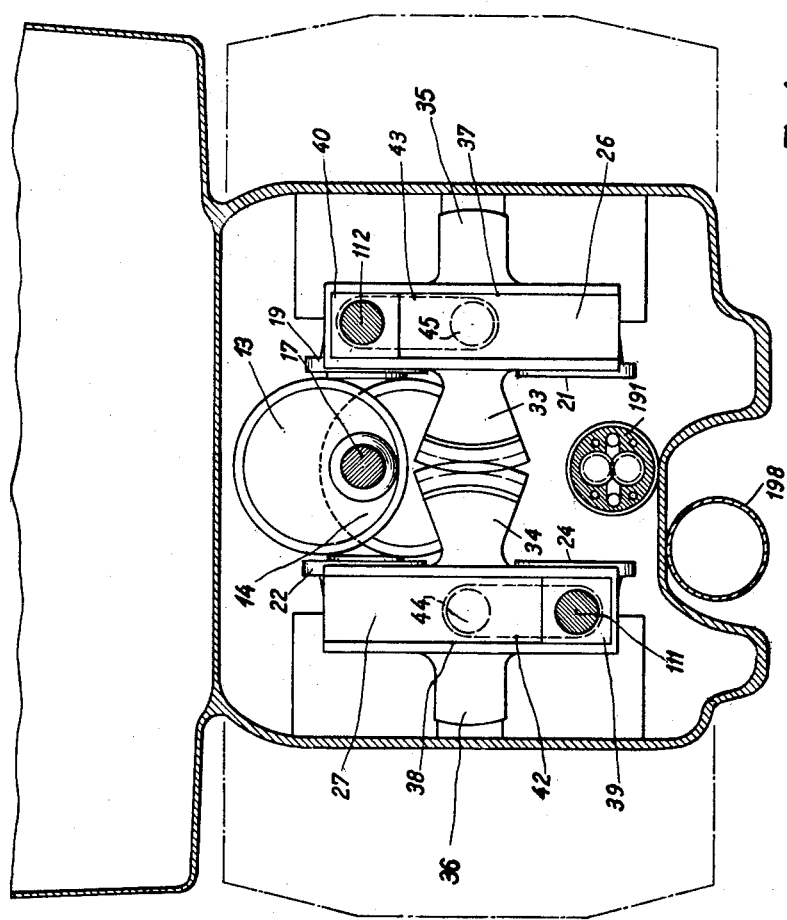

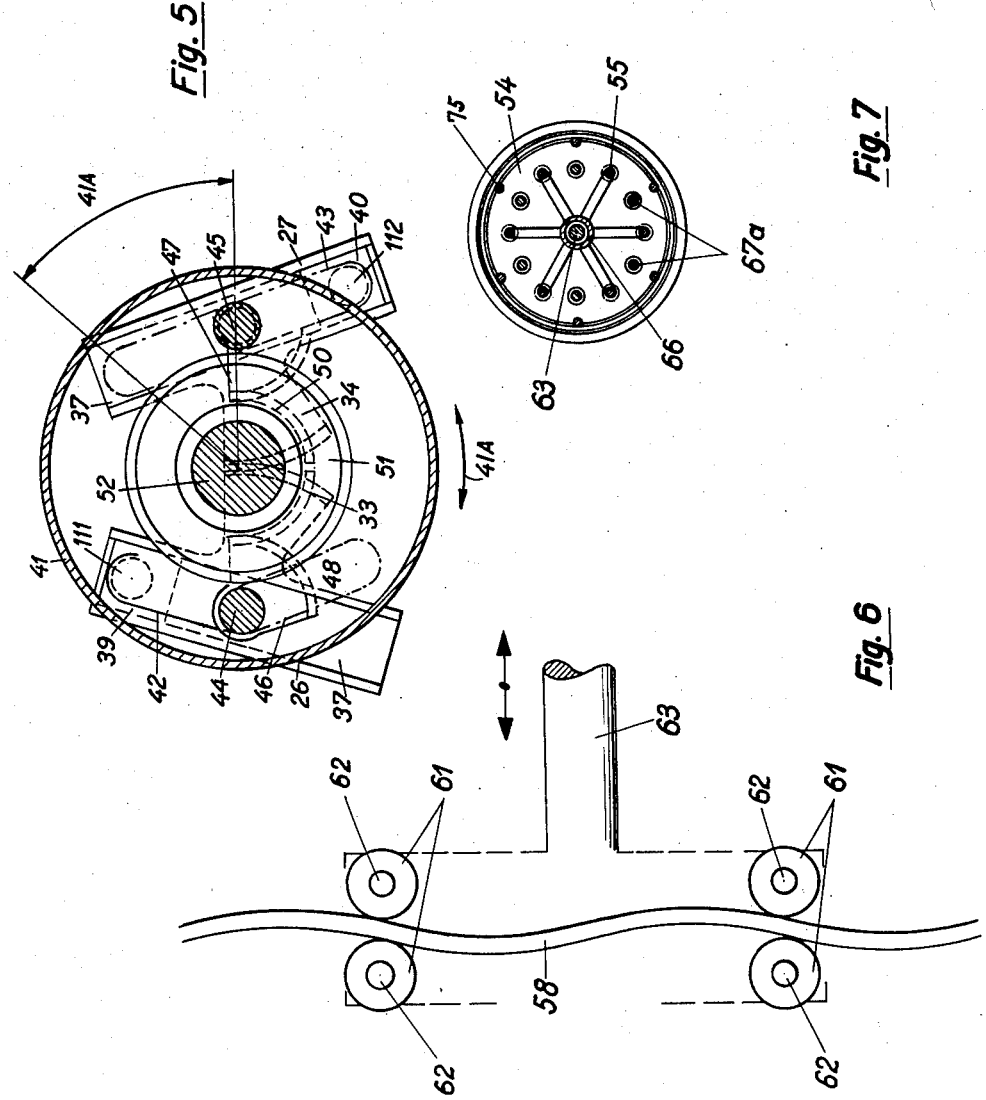

Sept. 1, 1964        H. KLAUE        3,146,627
POWER DRIVE
Filed July 22, 1960        8 Sheets-Sheet 6
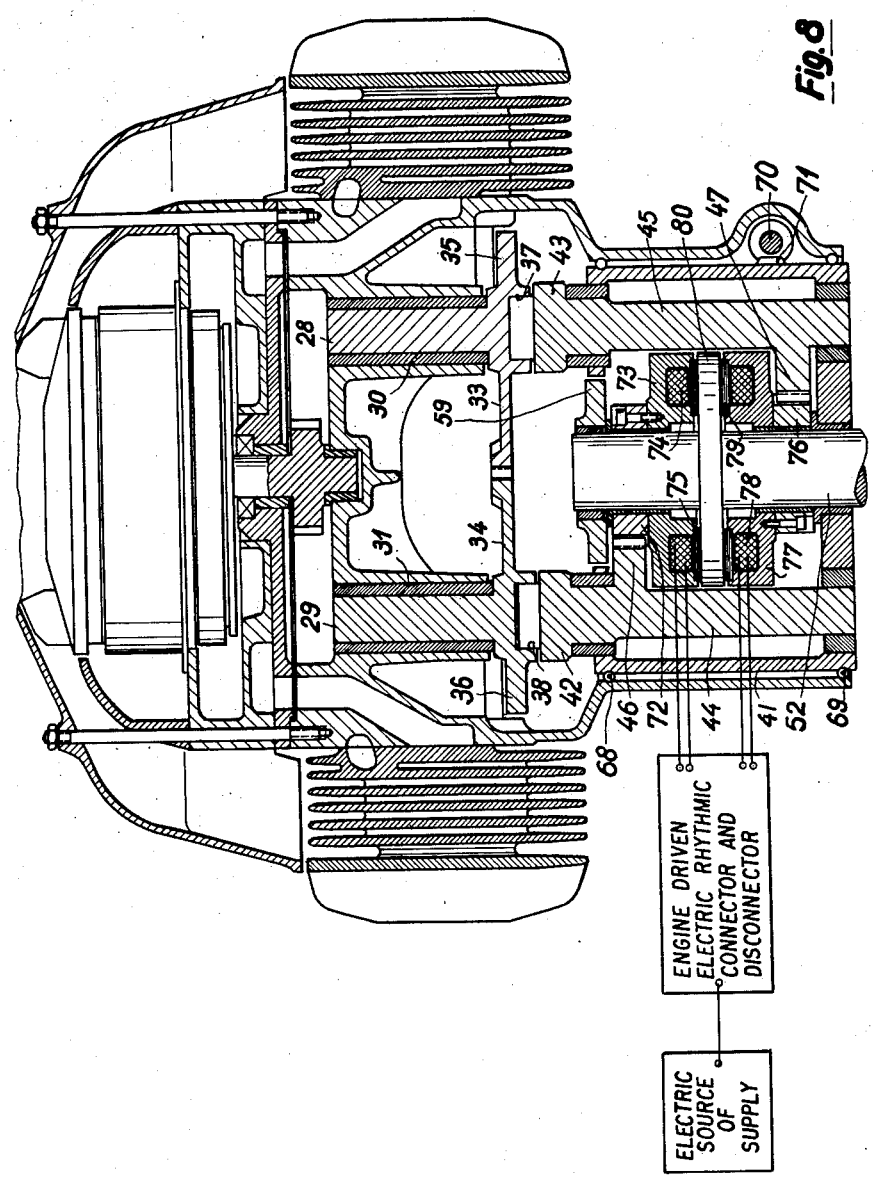

Sept. 1, 1964     H. KLAUE     3,146,627
POWER DRIVE
Filed July 22, 1960     8 Sheets-Sheet 7
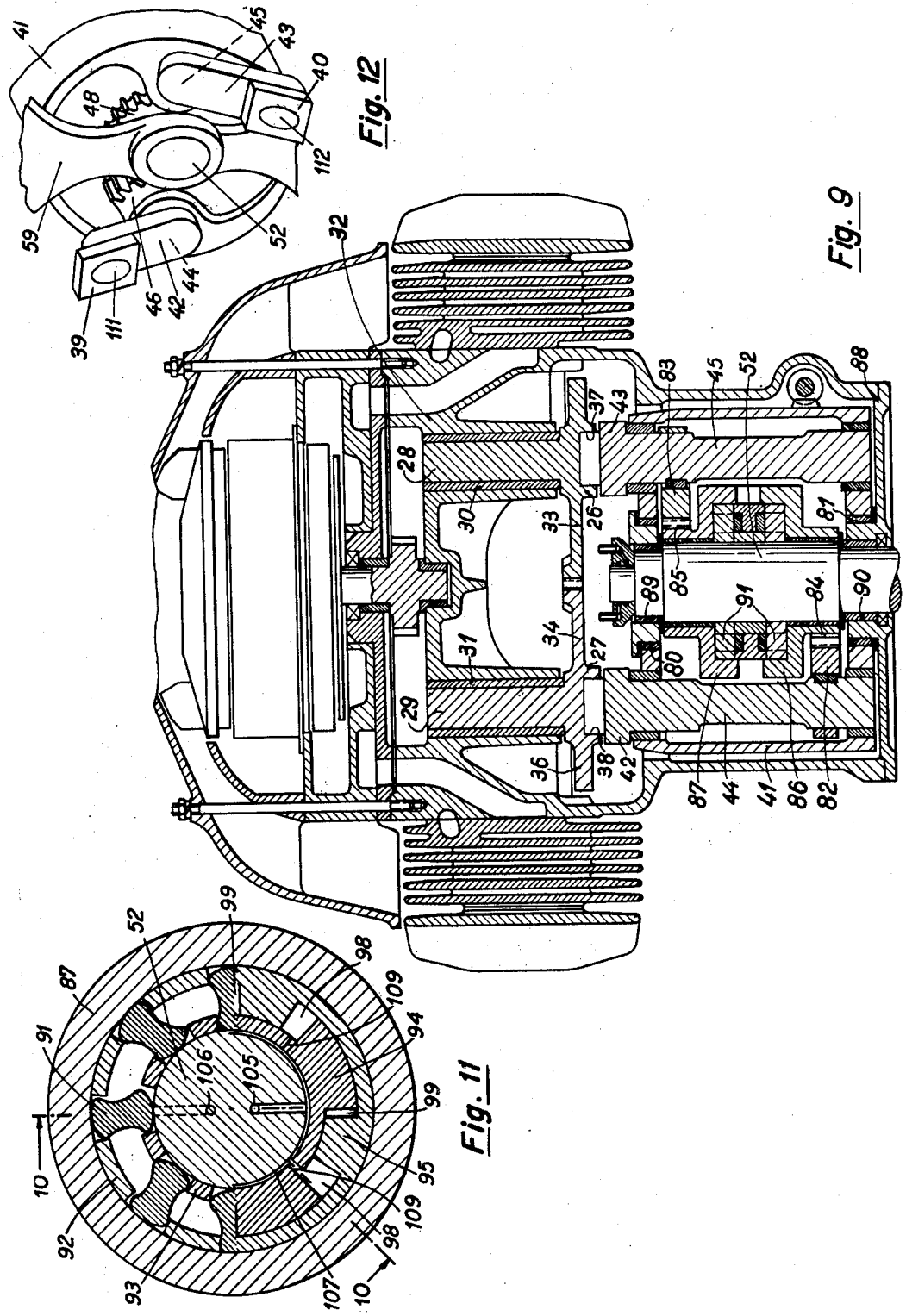

United States Patent Office
3,146,627
Patented Sept. 1, 1964

3,146,627
POWER DRIVE
Hermann Klaue, Case Postale 151,
Montreux, Switzerland
Filed July 22, 1960, Ser. No. 44,612
11 Claims. (Cl. 74—125.5)

The invention relates to power drives, and relates more particularly to drive mechanisms of the type where the reciprocating motion of oscillating pistons of an internal combustion engine is converted in a stepless manner into a unidirectional rotary motion of a take-off shaft; still more particularly, the invention relates to transmission mechanisms where two opposite clutches both acting in the same sense derive their energy from the reciprocating pistons of an internal combustion engine and alternately and intermittently rotate said shaft.

Internal combustion engines are known which aim at the foregoing objectives, reference being had, for instance, to my Patent No. 2,913,914, dated November 24, 1959, and to my co-pending application Ser. No. 617,058, filed October 19, 1956, now Patent No. 3,003,307, dated Oct. 10, 1961.

The instant invention is in the nature of an improvement over the aforesaid disclosures, and has among its principal objects to achieve a more accurate engagement and disengagement of the parts effecting the pulsating power transmission and of simplifying the overall structure.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein:

FIG. 2 is a fragmentary sectional view taken on the line 2—2 of FIG. 1;

FIG. 3 is a fragmentary sectional view taken on the line 3—3 of FIG. 1;

FIG. 4 is a fragmentary sectional view taken on the line 4—4 of FIG. 1;

FIG. 5 is a schematic detail view, partly in section taken on the line 5—5 of FIG. 2, of some parts including a tiltable yoke for stepless speed adjustment;

FIG. 6 is a large scale schematic development view showing some parts of a control mechanism;

FIG. 7 is a sectional view taken o the line 7—7 of FIG. 1;

FIG. 8 is a fragmentary sectional view similar to FIG. 1, but embodying a modification;

FIG. 9 is a fragmentary sectional view similar to FIG. 1, but embodying a further modification;

FIG. 11 is a sectional view taken on the line 11—11 of FIG. 10; and

FIG. 12 is a fragmentary perspective view seen in the direction 12—12 of FIG. 2.

Figure 1:
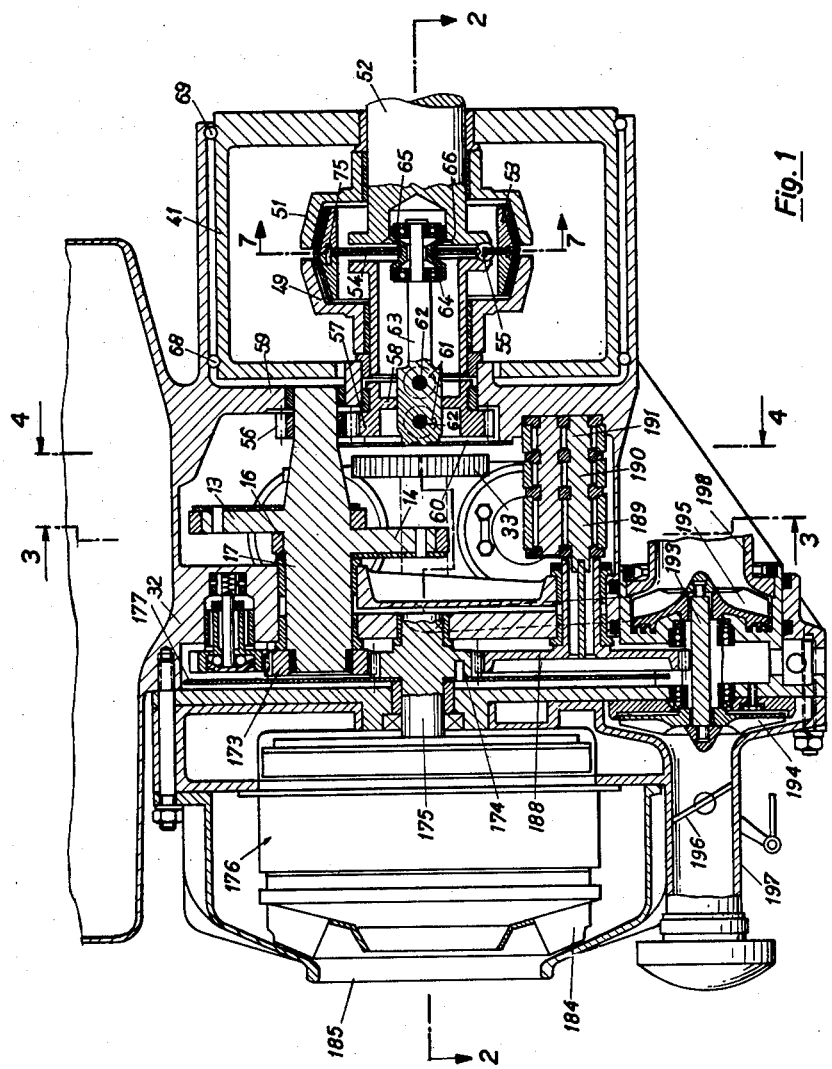
FIG. 1 is a fragmentary longitudinal sectional view of a power transmission mechanism in accordance with an embodiment of the invention.

In carrying the invention into effect in the embodiments which have been selected for illustration in the accompanying drawings and for description in this specification, and referring now particularly to FIGS. 1–7, there is provided an internal combustion engine which has freely oscillating pistons that slide in cylinders. For the sake of simplicity, there has been shown in the drawings a four-cylinder, free-piston engine which has two pistons at each side working synchronously in cylinders that face each other oppositely. The upper pistons 1 and 2 (FIG. 3) oscillate in the cylinders 3 and 4, respectively, and the lower pistons 5 and 6 oscillate in the cylinders 7 and 8, respectively. Cylinder heads 72 and 73 are provided which close the cylinders 3 and 7, and 4 and 8, respectively.

The two upper pistons 1 and 2 are in positive driving connection with an eccentric shaft 17 (FIG. 1). The transmission from the pistons 1 and 2 to the shaft 17 proceeds by way of compression springs 9 and 10 (FIG. 3), which are disposed on the piston interiors, and thence by way of pressure pieces 11 and 12 that are supported by the springs 9 and 10; the pressure pieces 11 and 12 are in contact with annular cam surfaces 15 and 16 of eccentric cams 13 and 14 of the shaft 17 (FIGS. 1 and 3).

Converter means are provided to convert the reciprocating piston motion into a rotary motion of a take-off shaft 52. These include two intermeshing swing levers 26 and 27 (FIG. 3). The swing lever 26 engages grooves 22 and 24 of sliding members 18 and 20 which are secured on the pistons 1 and 5, respectively; similarly, the lever 27 engages grooves 23 and 25 of sliding members 19 and 21 which are carried by the pistons 2 and 6, respectively. In this manner, the swing lever 26 is connected to the pistons 1 and 5, and the swing lever 27 to the pistons 2 and 6.

The swing lever 26 is tiltable about a trunnion 28, and the swing lever 27 is tiltable about a trunnion 29; the trunnions 28 and 29 are supported in the motor casing 32 (FIG. 2) by means of bearings 30 and 31. The swing levers 26 and 27 are provided with extensions that have arcuate racks 33 and 34, respectively, which mesh as shown in FIGS. 2–5. The lever 26 has furthermore an extension 35 (FIG. 4), and the lever 27 an extension 36, and these extensions serve for balancing the masses.

As best shown in FIG. 2, the swing levers 26 and 27 have front grooves 37 and 38, respectively, in which there are movably, for instance slidably, disposed guides or sliding bodies 39 and 40, respectively. To the sliding body 39, as best shown in FIG. 12, there is pivoted at 111 a swinging crank 42 on which there is secured a pin 44; and similarly, to the sliding body 40 there is pivoted at 112 a swinging crank 43 to which there is secured a pin 45. The pins 44 and 45, as best shown in FIGS. 2 and 5, are supported by and movable with a yoke 41 that is tiltable in opposite directions, as indicated by an arrow 41A (FIG. 5).

A tilting of the yoke 41 will cause the pins 44 and 45 to slide the bodies 39 and 40 in the grooves 37 and 38; and this will result in an increase or decrease of the effective length of the leverage of the swinging cranks 42 and 43. A gear segment 46 (FIGS. 2 and 5) is secured to the pin 44, and meshes with a gear segment 48 that forms part of a first clutch or clutch bell 49; similarly, a gear segment 47 is secured to the pin 45 and meshes with a gear segment 50 of a second clutch or clutch bell 51. The clutch bells 49 and 51 face each other oppositely and are coaxial with the tilting axis of the yoke 41 and with a take-off or driven shaft 52.

The two opposite clutch bells 49 and 51 form part of the clutch means of the transmission, and define on the interior a chamber in which there are housed the driven clutch part as well as the control means for the clutch means. The clutch bells 49 and 51 have outward flaring opposite conical portions, and the driven clutch part includes a double conical clutch ring 53 that is provided on the double cone with an external friction lining and is movable in opposite axial directions to engage alternately either the clutch bell 49 or the clutch bell 51.

The clutch ring 53 is connected to a radially slit cup spring plate 54 which includes two superposed disks. The cup spring plate 54 is connected to the shaft 52; the clutch ring 53 is thus in driven relation with the shaft 52.

The cup spring plate 54 furthermore is pivotable about ball type swivelling members 55 that are journalled on the shaft 52. The clutch ring 53 may be pressed against the conical bearing surface of either the clutch bell 49 or the clutch bell 51 by means of the cup spring plate 54 when the latter is being pivoted about the swivelling members 55, either in one or the opposite direction axially of the shaft 52.

Control means are provided in order to move the cup spring plate 54 about its pivots to couple thereby alternately the clutch ring 53 to the clutch bell 49 and respectively to the clutch bell 51, rhythmically in timed relation with the movement of the pistons. The control means comprises the eccentric shaft 17 which drives a gear 56; the gear 56 meshes with a gear 57 which is coaxial with the shaft 52, and the gears 56 and 57 have a predetermined ratio of transmission; for instance, the gears 56 and 57 may transmit at a ratio of 1:2. The gear 57 is journalled in the wall 59 of the casing 32, and is provided at its cylindrical inner surface with a cam means, such as a sinusoidal band 58 (FIGS. 2 and 6) which is engaged by cam follower means such as rolls 61 that unroll on the band 58. The rolls 61 turn about axles 62 that are formed on a slide 63 that is movable in opposite directions axially of the shaft 52. In this manner, an axial oscillating cam movement is transmitted by the band 58 to the rolls 61 in timed relation to the revolutions of the eccentric shaft 17, and will be imparted by the rolls 61 to the slide 63. The slide 63 is held against rotation by a spring disk 60 (FIGS. 1 and 2) that is secured, for instance by screws, to the wall 59 of the casing 32. Pressure bearings 64 and 65 transmit the axial oscillating movement to the clutch ring 53, by means of a ring 66 which is secured at the center to the cup spring plate 54 and which rotates therewith, and thence by means of said cup spring plate 54, that pivots about the swivelling members 55, to the clutch ring 53.

In order to arrange two opposite pairs of rolls 61 on the slide 63, a transmission ratio of the gears 56 and 57 of 1:2 has been selected for the instant example. To the take-off shaft 52, at the diameter at which there are arranged the swivelling members 55, there is secured, for instance by screws 67a (FIG. 7), a tubular extension 67. The tubular extension 67 is journalled in the wall 59 of the casing 32.

The yoke 41 is journalled for tilting in the casing 32, by means of ball bearings 68 and 69, and may be tilted in either direction of the arrow 41A (FIG. 5) by turning a threaded spindle 70 (FIG. 2) that is in mesh with a rack 71 that is formed on the yoke 41.

Both clutch bells 49 and 51 are arranged coaxially about the shaft 52, and face each other oppositely, and are rotatable about said axis.

The operation of the above described device is as follows:

The pistons 1 and 2 (FIG. 3) perform the compression stroke. The pistons 5 and 6, on the other hand, have completed the compression stroke, and ignition has taken place causing reversal of the direction of movement of the pistons 5 and 6. At that instant a new working stroke commences and, as the pistons 1 and 2 are rigidly coupled to the pistons 5 and 6, by means of the meshing swing levers 26 and 27, the same cycle will take place at a 180° phase displacement in connection with the pistons 1 and 2.

The pistons 1 and 2 are flexibly connected to the eccentric shaft 17, by means of the springs 9 and 10, and all the pistons are rigidly coupled to the swing levers 26 and 27 by means of the displaceably arranged sliding members 18 and 20, and 19 and 21, respectively. The swing levers 26 and 27 transmit the impulses, received from the pistons at the aforesaid phase differential, to the swinging cranks 42 and 43 by means of the sliding bodies 39 and 40, respectively.

The sliding bodies 39 and 40 can be displaced in their respective grooves 37 and 38 of the levers 26 and 27, by adjustment of the tilting position of the yoke 41, thereby steplessly changing the transmission.

From the swinging cranks 42 and 43 the impulses are transmitted to the pins 44 and 45, and thence to the clutch bells 49 and 51, by means of the gear segments 46 or 47 and the gear segments 48 or 50, respectively.

At the instant of piston reversal, the respective clutch bell is driven in the sense of rotation of the take-off shaft 52, and the clutch ring 53 will be coupled to the respective clutch bell. This coupling is achieved by means of the axial shifting movement of the slide 63 that is imparted to the slide 63 by the cam and cam follower action of the band 58 of the gear 57, that is driven by the gear 56 from the eccentric shaft 17, and the rolls 61 which turn about their axles 62; the shifting movement of the slide 63 is transmitted to the bearings 64 and 65 and to the ring 66 and thence to the cup spring plate 54 and to the clutch ring 53. After a rotation of 180° of the eccentric shaft 17, the slide 63 will be moved in the opposite direction and thereby the clutch ring 53 be coupled to the other clutch bell.

As best shown in FIG. 1, the shaft 17 drives, by means of gears 173 and 174 and a shaft 175, a generator 176 designed as a fly wheel. On the shaft 175 there is also disposed a rotary inlet valve 177 designed as a flat dishlike valve controlling by its revolutions the inlet of the gas or air into the cylinders of the internal combustion engine. Fan blades 184 are disposed on the rotating casing of the generator 176 for generating a flow of cooling air which is taken in through an opening 185, and conducted through ducts 186 and 187 to the cooling fins of the cylinder heads 72 and 73, to cool them.

The gear 174 on the shaft 175 is connected by means of a gear 188 with a shaft 193 supporting on the front side thereof a charging blower 194, and on the rear thereof a radial turbine wheel 195 of an exhaust gas turbine. The gear 188 drives a gear pump 189, a pressure pump 190 for the circulating lubricant and a pressure pump 191, for actuation.

The charging blower 194 sucks in air from a suction duct 197 which is controlled by a throttle valve 196 and forces the compressed air to the rotary slide valve 177. The exhaust gas turbine wheel 195 discharges into a conduit 198, for eventual discharge into the turbine casing.

The above described movements taken off the shaft 17 are not a necessary part of this invention, and have herein been briefly mentioned only for the sake of completeness. They are more fully described in my aforementioned Patent No. 3,003,307.

In the modification of FIG. 8, transmission of the clutch momentum takes place through electromagnetically operated friction clutches. The gear segment 46 engages a gear segment 72 of a first swinging clutch part or clutch 73 of the electro-magnetic clutch means. The clutch 73 has a coil 74 for generating an electric field, and a friction disk 75. The gear segment 47 engages a gear segment 76 of a second swinging clutch part or clutch 77 that carries a coil 78 and a friction disk 79. The coils 74 and 78 form part of an electric circuit and when current is fed into the circuit, the respective magnetic flux is closed by means of a disk 80 that forms a rotating clutch part and is rigidly secured to the take-off shaft 52 and rotates therewith, and operative coupling is established.

Figure 10:
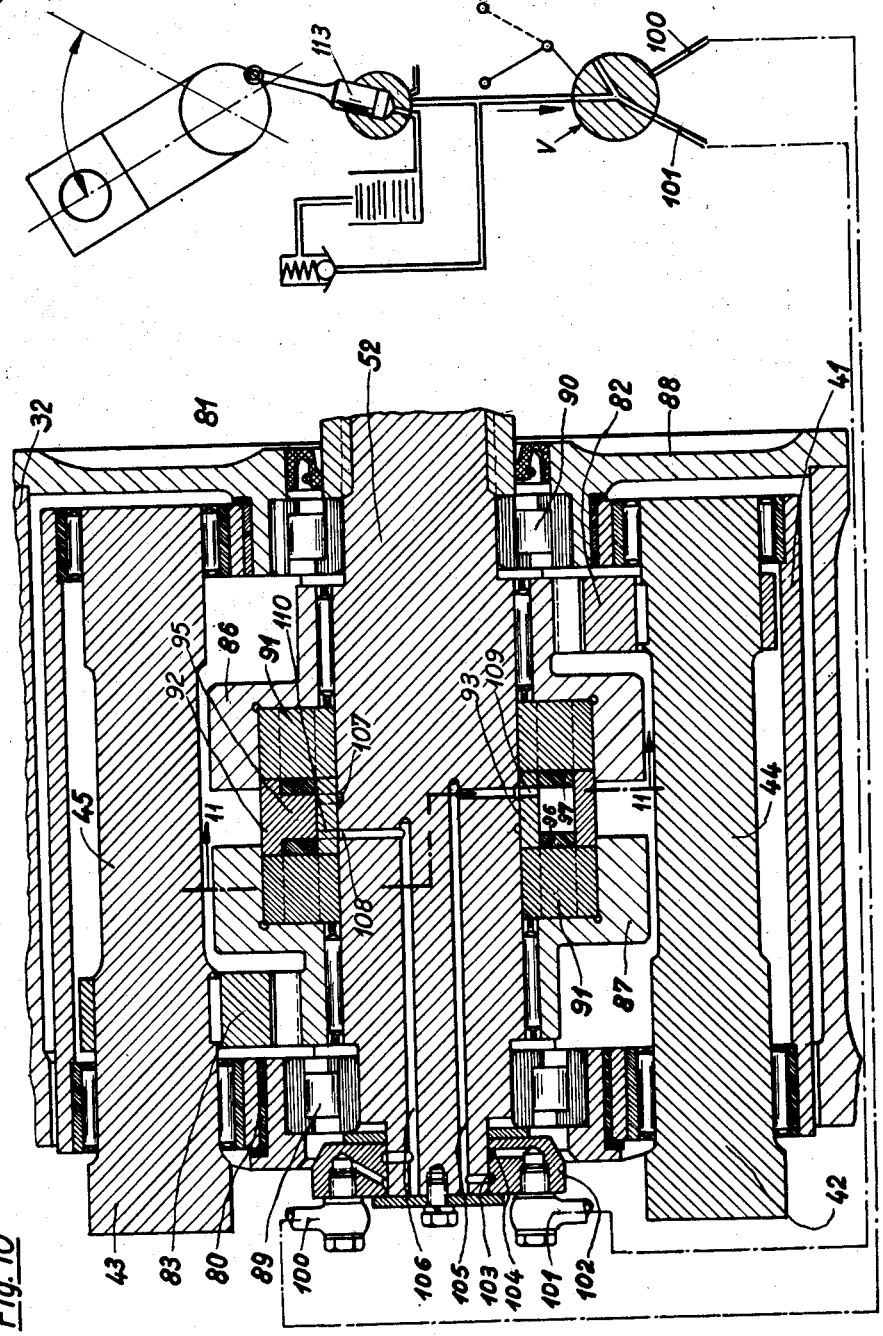
FIG. 10 is a large scale fragmentary sectional view taken on the line 10—10 of FIG. 11, of a detail showing the modification of FIG. 9.

In the further modification illustrated in FIGS. 9–11, gear segments 82 and 83 are keyed to the pins 44 and 45, respectively. The gear segment 82 meshes with a gear segment 84 which forms part of a first free-wheel clutch bell 86 that therefore swings in timed relation with its respective piston oscillations. Opposite the first clutch bell 86, there is arranged a second free-wheel clutch bell 87 that carries a gear segment 85 that is engaged by the gear segment 83 of the pin 45; the clutch bell 87 will swing in timed relation with its respective piston oscillations. Both clutch bells 86 and 87 are arranged coaxially with the take-off shaft 52, and face each other oppositely and surround said shaft 52, and are rotatable in opposite directions about said axis. The shaft 52 is journalled in bearings 89 and 90 of the casing 32, the latter being provided with a cover plate 88.

Between the cylindrical inner surfaces of each of the bells 86 and 87, and the cylindrical outer surface of the shaft 52, there is arranged a series of symmetrically shaped clamping bodies 91, and for the clamping bodies 91 of both series there are provided one outer cage 92 and one inner cage 93. The outer and inner cages are provided with recesses that engage the clamping bodies 91. One or both cages may be turned about the axis of the shaft 52 in opposite directions. Lateral coverings 96 and 97 are provided between the outer and inner cages 92 and 93.

The clamping bodies 91 have symmetrical shape, and are so constructed that they operate in either sense of rotation; they are distributed evenly throughout the periphery of the clutch bells 86 and 87.

In the position illustrated in FIG. 3, the torque is transmitted in clockwise direction. Means are provided to achieve a play-free positioning of the clamping bodies 91 against the cylindrical inner surfaces of the clutch bells 86 and 87 and against the cylindrical outer surface of the shaft 52. These means comprise outwardly directed extensions 94 that are formed on the inner cage 93 and inward extensions 95 that are formed on the outer cage 92; the extensions 94 and 95 define with the lateral coverings 96 and 97 hollow spaces 98 and 99 which form receptacles for a pressure fluid such as pressure oil.

In the operation step shown in FIG. 10, where torque transmission is clockwise, pressure oil is led into the hollow spaces 98, while the hollow spaces 99 are free from pressure oil and hence free from pressure. From the motor pump 113 oil is pressed through a valve V and, by means of ducts 100 and 101, into an oil supply ring 102. The ring 102 is provided with grooves 103 and 104, and each groove is fed from one of the aforesaid ducts and transmits the oil through borings 105 or 106 into grooves 107 or 108 of the shaft 52. From the grooves 107 or 108, the oil is led through borings 109 or 110, formed in the inner cage 93, into the aforesaid hollow spaces 98 or 99, respectively.

For example, during one sense of rotation the pressure oil entering from the duct 100 is led into the groove 103 and from there through the boring 105 into the groove 107, reaching the hollow spaces 98 through the borings 109. At the inverse sense of rotation, the pressure oil received from the duct 101 is led into the groove 104, to the boring 106, into the groove 108, through the borings 110 into the hollow spaces 99. At that moment the spaces 99 are connected to the oil sump and are thus without pressure.

The aforesaid hydraulic system makes it possible to be operated in either sense of rotation, so that by reversing the direction of straining a torque transmission in the opposite sense of rotation can be effected without any need of additional reverse gearing. This may be utilized, for instance in an automotive vehicle, to start the motor from the drive wheels. The cages rotate with the clamping bodies 91, thereby avoiding well-known disadvantages of existing free-wheel clutches.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A power drive, comprising an internal combustion engine including at least two reciprocating pistons, a driven shaft, converter means operable for converting in a stepless manner the reciprocating piston motion into a rotary motion in one direction of said shaft comprising an oscillating lever in driven connection with each piston, a guide driven by each oscillating lever, a yoke tiltable about an axis, two swinging cranks supported by and tiltable with said yoke and each driven by a guide, and two clutches both acting in one sense of direction and being in driving connection with said shaft and operable to set in rotation alternately and intermittently said shaft and each being in driven connection with a swinging crank, and control means in driven relation with said pistons and being operable for alternately operating said clutches in timed relation with the piston oscillations.

2. A power drive, comprising an internal combustion engine having at least two reciprocating pistons, a driven shaft, converter means operable for converting the reciprocating piston motion into a rotary motion of said shaft including two clutches in driving connection with said shaft and operable to set alternately and intermittently said shaft in rotation, and control means responsive to the oscillations of said pistons and operable for alternately operating said clutches in timed relation with the piston oscillations.

3. A transmission mechanism, for use in connection with an internal combustion engine having two reciprocating pistons, comprising a take-off shaft, clutch means in driven connection with said shaft and operable to rotate said shaft unidirectionally and including two opposite clutches both acting in the same unidirectional sense, converter means operable between said pistons and said clutch means to energize alternately each clutch, and including a yoke tiltable about an axis, said clutches being arranged to be disengaged at the instant of piston reversal and disposed axially of the tilting axis of said yoke.

4. A transmission mechanism, for use in connection with an internal combustion engine having two reciprocating pistons, comprising a take-off shaft, clutch means in driving connection with said shaft and operable to rotate said shaft unidirectionally and including two opposite clutches both acting in the same unidirectional sense, converter means operable between said pistons and said clutch means to energize alternately each clutch, and control means in driven relation with said pistons and operable for alternately operating said clutches in timed relation with the piston oscillations.

5. A transmission mechanism, as claimed in claim 4, said converter means comprising two oscillating levers each driven from a piston, two guides each movably connected to a lever and oscillatable with said lever and movable relative thereto, a swinging crank movably connected to each guide and having a pin, a tiltable yoke supporting the pins of the swinging cranks and operable to move them during yoke tilting for stepless conversion, each pin being geared to a clutch, said control means comprising a clutch ring disposed between said clutches and connected to said shaft and movable in opposite directions for alternate frictional coupling with either clutch.

6. A transmission mechanism, as claimed in claim 5, together with, a slit cup spring plate forming part of said converter means and of said control means and comprising two disks connected to said shaft and to said clutch ring, and including swivelling members pivoting said cup spring plate relative to said shaft.

7. A transmission mechanism, as claimed in claim 6, together with, an eccentric shaft driven by said pistons, said control means comprising a first gear driven by said eccentric shaft, a second gear meshing with said first gear and including cam means, cam follower means engaging said cam means and being oscillated thereby in opposite directions and being in driving connection with said cup spring plate.

8. A driving assembly, for use in connection with an internal combustion engine having at least two reciprocating pistons, comprising a take-off shaft, clutch means in driving connection with said shaft and operable to rotate said shaft unidirectionally and including two opposite clutches both acting in the same unidirectional sense and including swinging parts and rotating parts, converter means operable between said pistons and said clutch means to couple alternately either clutch with said shaft, and an electric circuit including electric coils connected to said parts and operable to generate electric fields, whereby torque transmission will be effected by reciprocal action by the electric fields of the swinging and the rotating clutch parts.

9. A driving assembly, for use in connection with an internal combustion engine having two reciprocating pistons, comprising a take-off shaft, clutch means in driving connection with said shaft and operable to rotate said shaft and including two oppositely disposed clutches, a free-wheel mechanism between said clutches and said shaft comprising inner and outer cages, and a series of displaceable clamping bodies between said cages and operable to transmit torque between said cages and thereby from either clutch to said shaft for shaft rotation in either of opposite directions, and control means operable for adjusting at least one of said cages to displace some of said clamping bodies.

10. A driving assembly, as claimed in claim 9, said control means comprising means for moving said cages including conduits for a pressure fluid and chambers defined by said cages communicating with said conduits for cage adjustment.

11. A driving assembly, as claimed in claim 9, said clutches operating at a phase displacement of 180°, separate clamping bodies being assigned to each clutch, all of said clamping bodies being engaged by said cages, said cages being operable to displace the clamping bodies of both clutches.

References Cited in the file of this patent
UNITED STATES PATENTS 1,476,766   Reynolds _____ Dec. 11, 1923
2,874,581   Hauser _____ Feb. 24, 1959